No. 659,592. Patented Oct. 9, 1900.
L. M. PIERRON & H. R. MILLER.
CAMERA ATTACHMENT.
(Application filed Oct. 9, 1899.)
(No Model.)
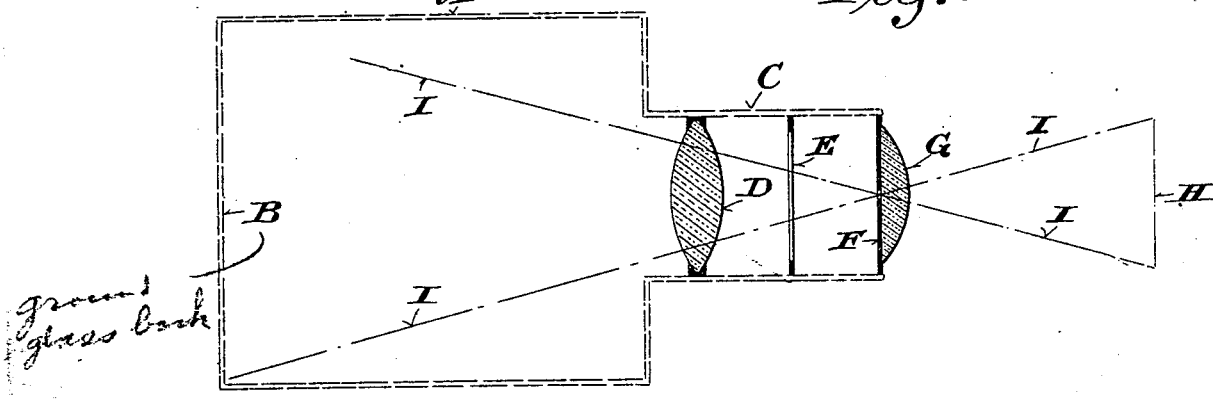
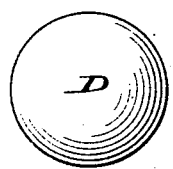
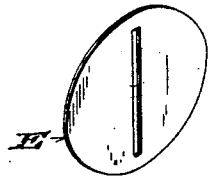
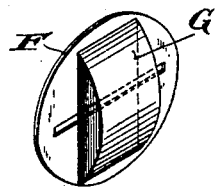

UNITED STATES PATENT OFFICE.

LOUIS M. PIERRON AND HERMANN R. MILLER, OF MILWAUKEE, WISCONSIN.

CAMERA ATTACHMENT.

SPECIFICATION forming part of Letters Patent No. 659,592, dated October 9, 1900.

Application filed October 9, 1899. Serial No. 732,994. (No model.)

*To all whom it may concern:*

Be it known that we, LOUIS M. PIERRON and HERMANN R. MILLER, citizens of the United States, and residents of Milwaukee, in the county of Milwaukee and State of Wisconsin, have invented certain new and useful Improvements in Camera Attachments; and we do hereby declare that the following is a full, clear, and exact description thereof.

Our invention has for its purpose to provide means for the distortion of images of objects projected into an ordinary photographic camera; and it consists in certain peculiarities of construction and combination of parts hereinafter particularly set forth, with reference to the accompanying drawings, and subsequently claimed.

Figure 1 of the drawings is a diagram illustrating a general construction and arrangement of parts embodied in our invention and their relative arrangement with respect to an ordinary photographic camera, the outlines of the box, ground-glass back, and lens-holder of the camera being represented by broken lines; Fig. 2, a front or rear elevation of a double-convex lens, such as is commonly employed in photographic cameras; Fig. 3, a perspective view of a vertically-slotted but otherwise opaque screen constituting a part of the means designed for the purpose above stated, and Fig. 4 a similar view of a horizontally-slotted but otherwise opaque screen surmounted by an exterior cylindrical lens crosswise of the slot.

Referring by letter to the drawings, A indicates the box, B the ground-glass back, C the tubular lens-holder, and D the double-convex lens, of an ordinary photographic camera. At intervals within holder C, forward of the double-convex lens D, we show centrally-slotted but otherwise opaque screens E F, the slot of one being at right angles to that of the other, and forward of the screen F, crosswise of its slot, is a cylindrical lens G, it being preferable in some instances to unite these last two elements of the combination.

We have shown the slot of screen E in a vertical direction and the slot of screen F in a horizontal direction; but said screens, with the cylindrical lens G, may be turned on a common axis to exactly reverse the direction of their respective slots or have each of these slots stand at a right angle to the other at any degree within one-quarter of a circle.

In practice the combination of slotted screens and cylindrical lens, above specified, is focused upon an object, and the optical result obtained by said screens and lens in conjunction with the double-convex lens is a distortion of the whole image of the object projected in the camera in a direction vertical, horizontal, or at an angle of any degree between a vertical and horizontal. The dotted line H in Fig. 1 represents the diameter of the aforesaid circle, and the dotted lines I in same figure indicate the path of pencils of light-rays employed to project the image of the focused object within the camera upon its ground-glass back or an interposed sensitive device, such as photographic plate or film.

From the foregoing it will be understood that the pencils of light-rays from the center of the focused object will first strike the cylindrical lens G and slot in screen F, and with respect to sharpness of the projected image of said object the organization of the apparatus is such as to admit of no more of the light than is absolutely necessary to obtaining the desired optical result. The light admitted through screen F passes on through the slot in screen E and is finally projected upon the ground glass of the camera or an interposed sensitive photographic plate or film. If the slotted screens and cylindrical lens are in the arrangement herein shown, the whole of the projected image of the focused object will be proportionately distorted in a vertical direction; but if said screens and lens be turned one-quarter of a circle the distortion will be in a horizontal direction, and it also follows that the direction of distortion may be at any angle between vertical and horizontal. If a human form be utilized as an object, the projected image of the same will appear short and stout or long and thin accordingly as the slotted screens and cylindrical lens are turned together on their common axis of rotation to have the slot in screen F horizontal or vertical and at right angles to the slot in the other of said screens.

To vary proportions of the focused image projected in the camera, the screen E will be utilized forward of screen F at a greater or less distance, this being a mere change in arrangement of the elements of our combination of slotted screens and cylindrical lens without in any way affecting the general optical result.

Having thus described our invention, what we claim as new, and desire to secure by Letters Patent, is—

The combination of the double-convex lens of a photographic camera, a pair of centrally-slotted but otherwise opaque screens at intervals forward of said lens, the screen-slots being at right angles to each other, and a cylindrical lens opposing one of the screens crosswise of its slot.

In testimony that we claim the foregoing we have hereunto set our hands, at Milwaukee, in the county of Milwaukee and State of Wisconsin, in the presence of two witnesses.

LOUIS M. PIERRON.
HERMANN R. MILLER.

Witnesses:
N. E. OLIPHANT,
B. C. ROLOFF.